Nov. 18, 1969  W. H. LOCKWOOD  3,478,892
NESTING AND STACKING UTILITY BIN
Filed Feb. 6, 1968  8 Sheets-Sheet 1

INVENTOR.
WARREN H. LOCKWOOD
BY
Baldwin, Egan, Walling & Fetzer
ATTORNEYS.

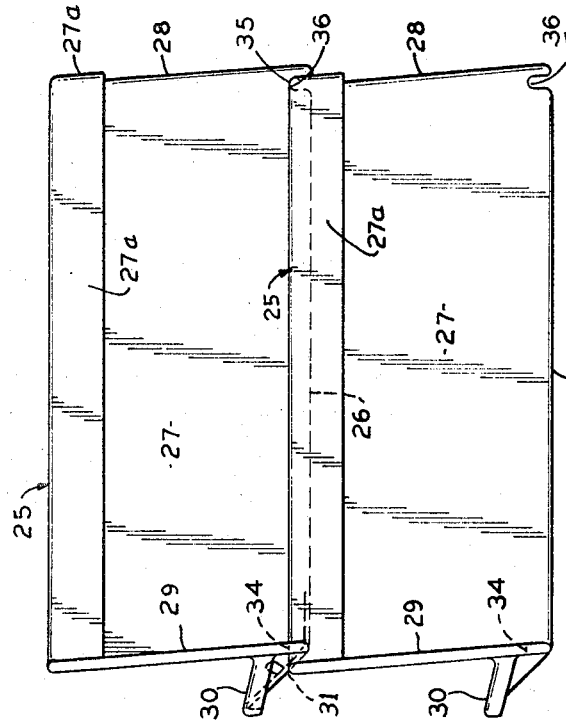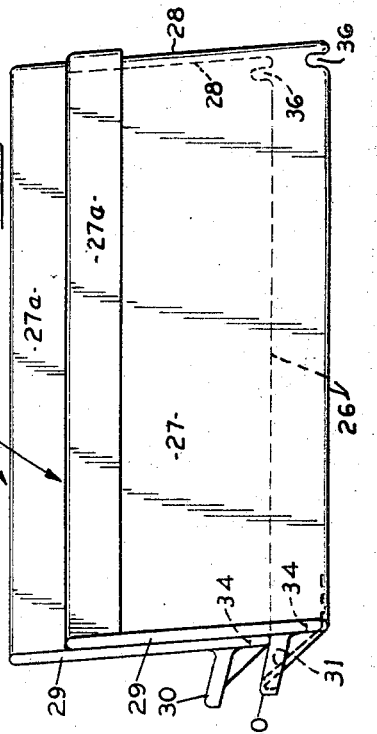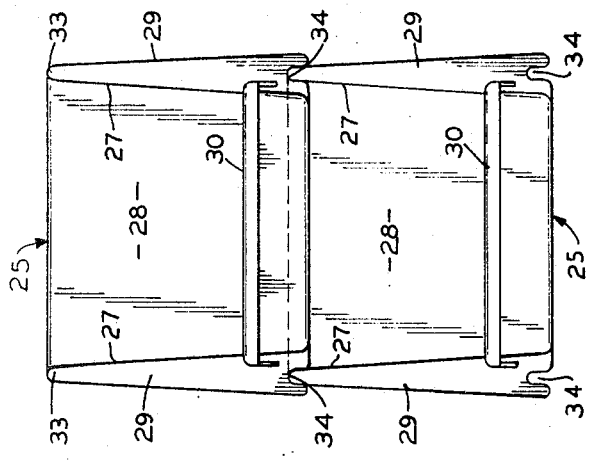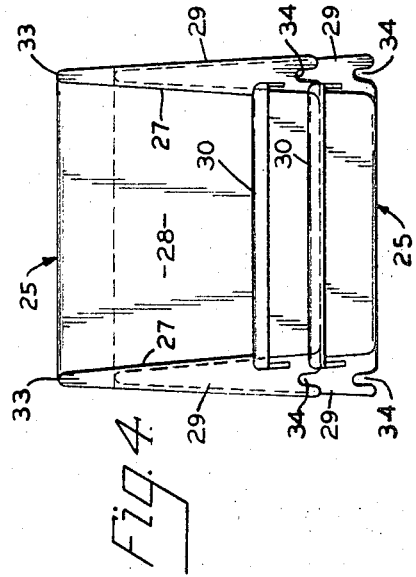

Nov. 18, 1969  W. H. LOCKWOOD  3,478,892
NESTING AND STACKING UTILITY BIN
Filed Feb. 6, 1968  8 Sheets-Sheet 3

INVENTOR.
WARREN H. LOCKWOOD
BY
Baldwin, Egan, Walling & Fetzer
ATTORNEYS.

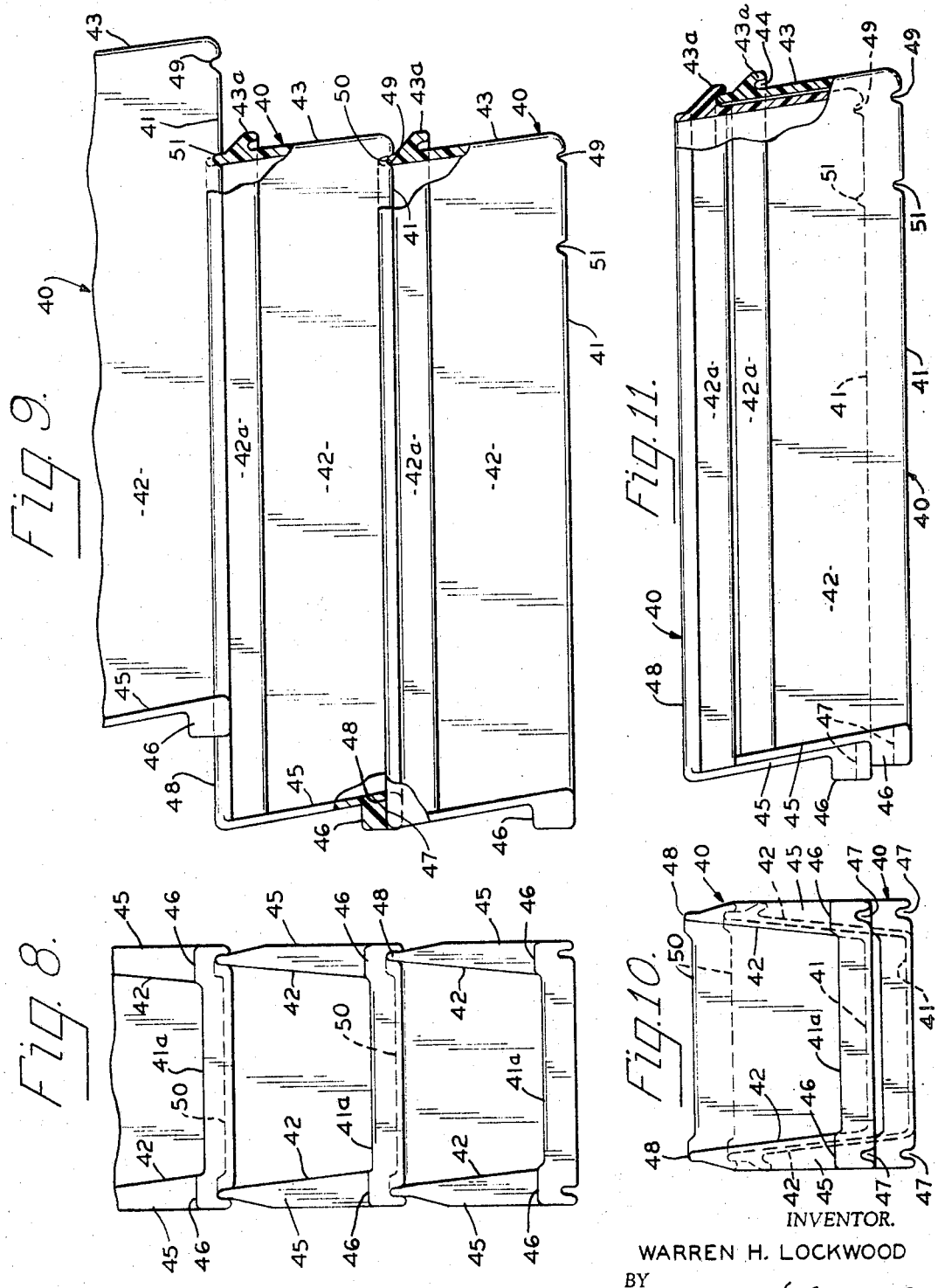
Nov. 18, 1969     W. H. LOCKWOOD     3,478,892
NESTING AND STACKING UTILITY BIN
Filed Feb. 6, 1968     8 Sheets-Sheet 4
INVENTOR.
WARREN H. LOCKWOOD
ATTORNEYS.

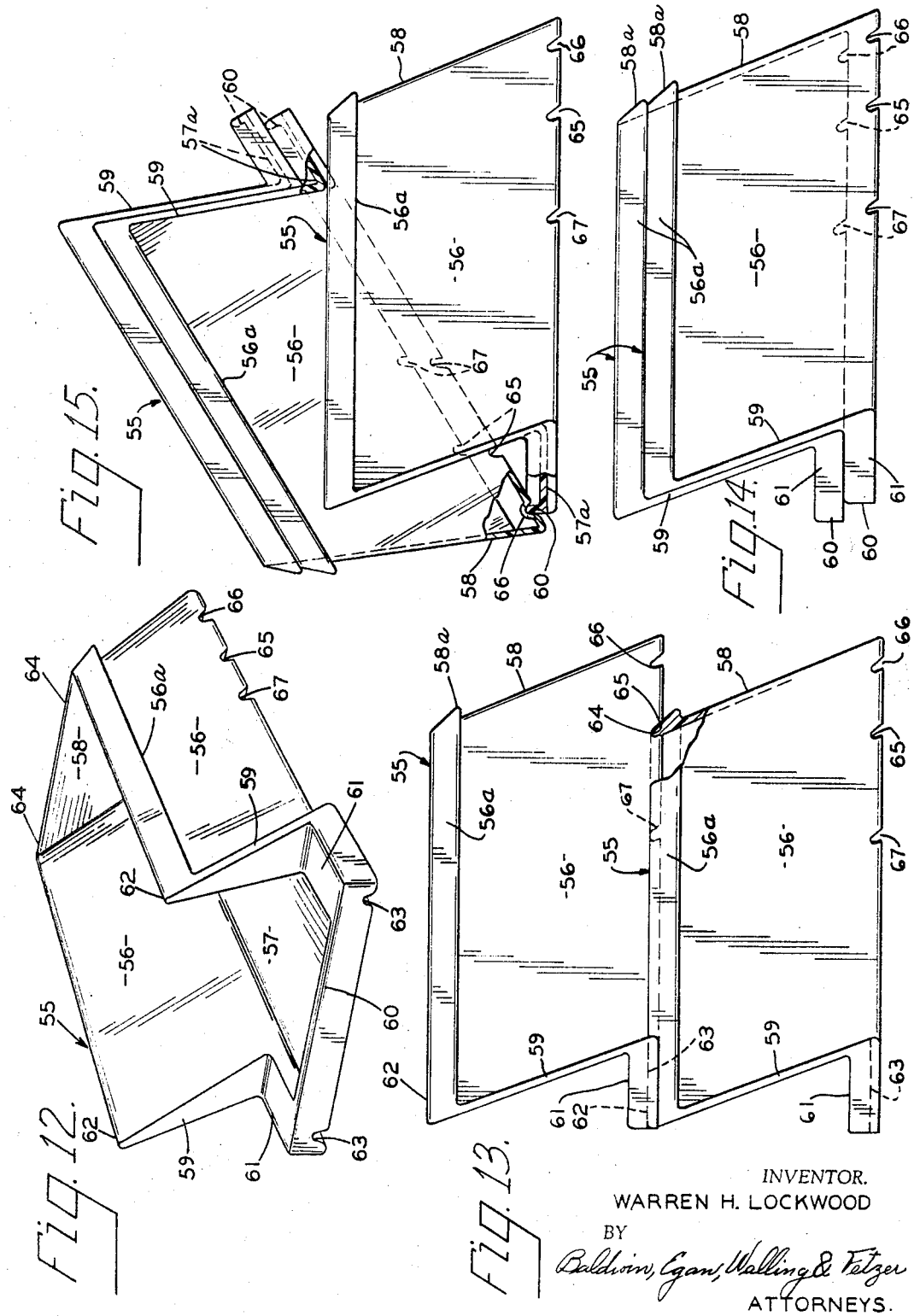

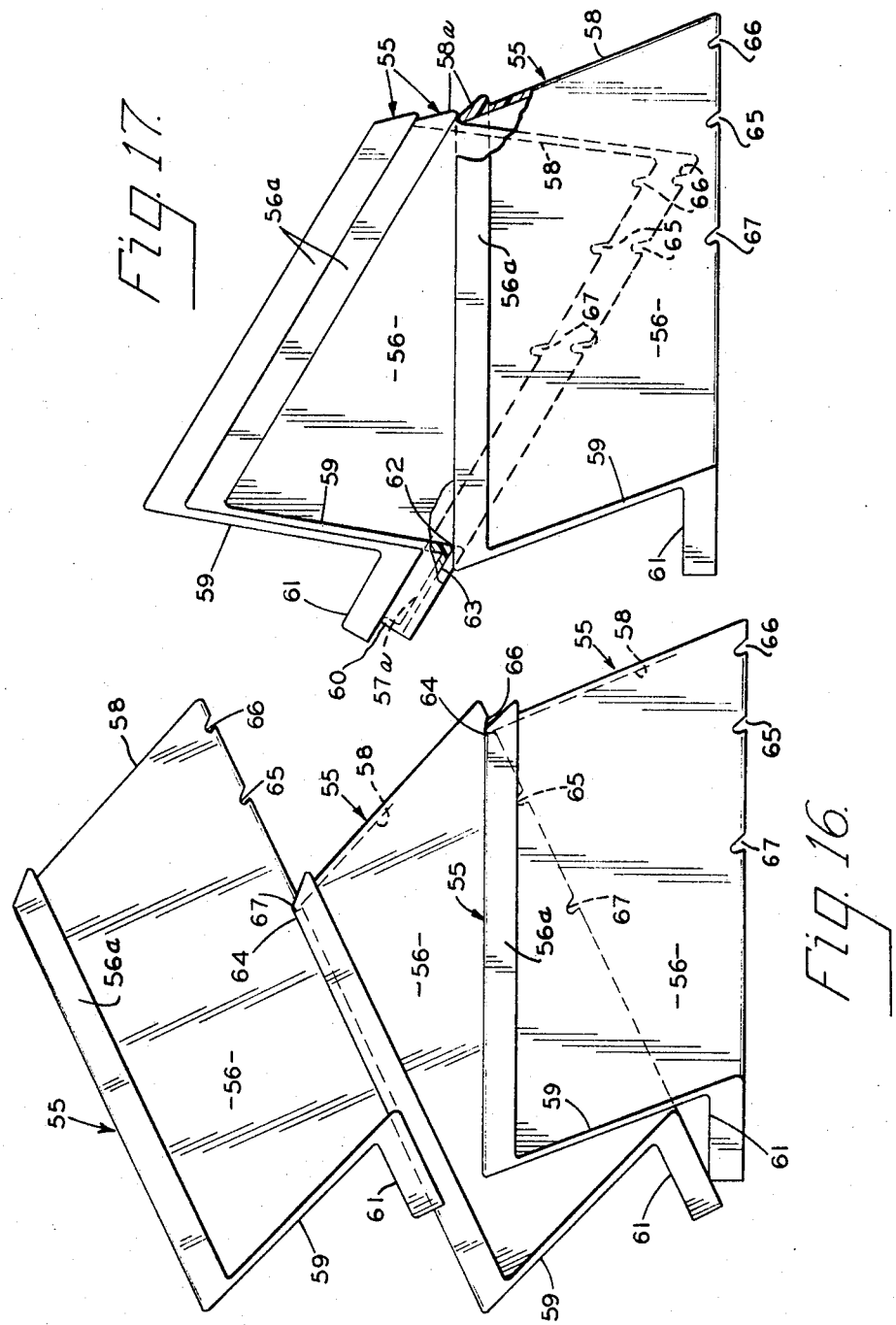

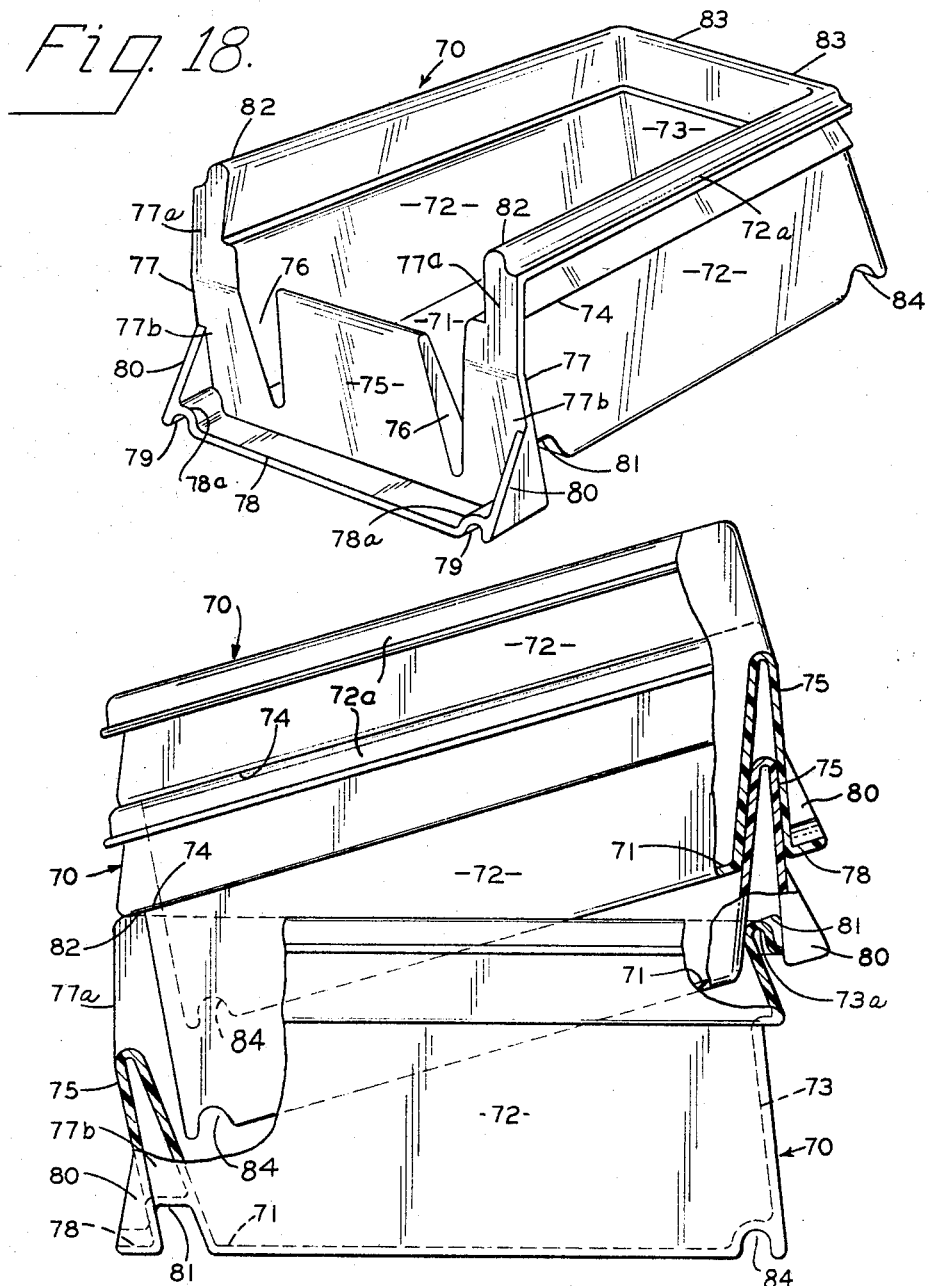

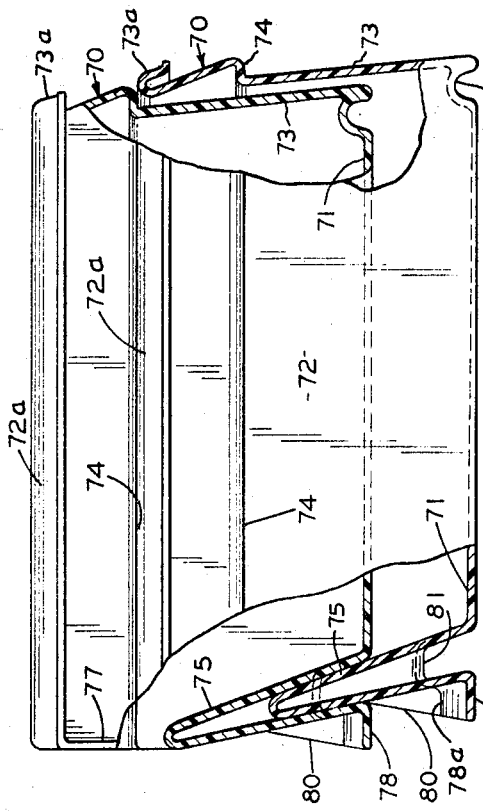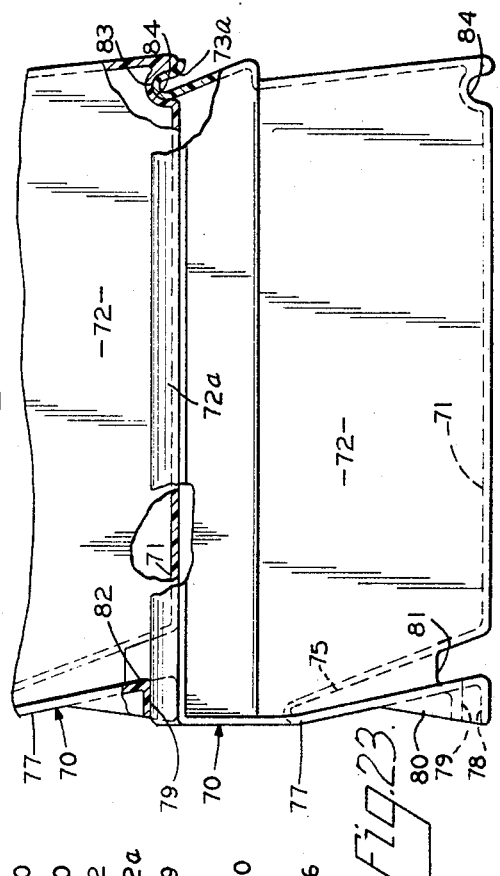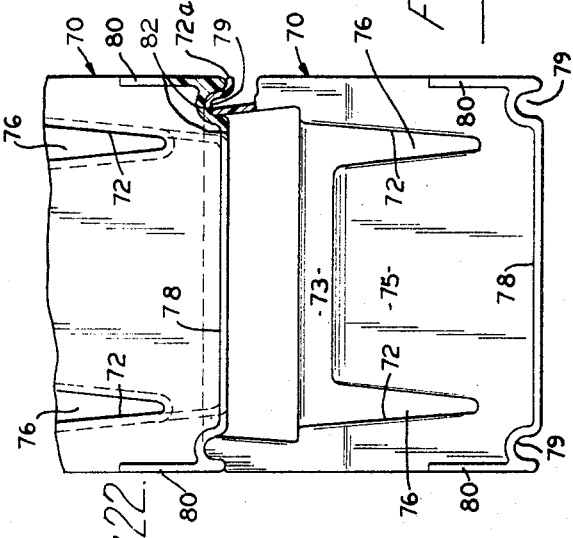

United States Patent Office 3,478,892
Patented Nov. 18, 1969

3,478,892
NESTING AND STACKING UTILITY BIN
Warren H. Lockwood, 1329 Granvia Altamira,
Palos Verdes Estates, Calif. 90274
Filed Feb. 6, 1968, Ser. No. 703,461
Int. Cl. A47f 3/14; A47j 47/00
U.S. Cl. 211—126                    17 Claims

ABSTRACT OF THE DISCLOSURE

A molded plastic utility bin has a bottom, two opposed side walls, an end wall and means for access to the bin at the opposite end. In one embodiment the access end is entirely open so that one bin can be moved horizontally through the open end of a like bin to nested position. In another embodiment a partial end wall is provided at the access end which terminates short of the upper edge of the bin so a user can reach in. In all cases two like bins can be nested, and where there is a partial end wall it will nest with a like wall of a bin above or below it. In all cases the bins can be stacked vertically in line. Each side wall is reinforced by a buttress member extending laterally outwardly and downwardly at its forward end. A lip extends forwardly at the front end of the bin between the buttress members and this strengthens the structure and adds to its usefulness. Where a stack of nested bins gradually gets out of vertical line, or a stack of tiered bins stepped back for display purposes gets out of vertical line, a line bin is utilized as a base unit to bring the stack back to the vertical.

---

For the most part, utility bins of the type involved in this invention have been most part totally enclosed on the four sides, especially where the bin was of substantial depth. The reason for this was that the two opposite side walls, if not supported across the front of the bin by an end wall are relatively weak and will not stand hard usage. An object of the present invention is to provide a utility bin of this character which is open, or at least partially open, for access to the front of the utility bin when tiered in a vertical stack with other like bins while at the same time reinforcing the front ends of the side walls so as to provide a very strong structure.

In the drawings:

FIG. 2 is a front elevational view of two of the bins of FIG. 1 in stacked relationship;

FIG. 3 is a side elevational view of two stacked bins according to FIG. 2;

FIG. 4 is a front end elevational view of two of the bins of FIG. 1 in nested relationship;

FIG. 5 is a side elevational view of two nested bins according to FIG. 4;

FIG. 8 is a front elevational view of three of the bins of FIG. 6, of which the bottom two are stacked vertically in line and the top one is stacked in a stepped back position for display or access purposes;

FIG. 9 is a side elevational view of the three bins of FIG. 8;

FIG. 10 is a front elevational view of two of the bins of FIG. 6 in nested position;

FIG. 11 is a side elevational view of the two nested bins of FIG. 10;

FIG. 12 is a perspective view of a bin comprising the third embodiment of this invention;

FIG. 13 is a side elevational view of two of the bins of FIG. 12 in position stacked and vertically in line;

FIG. 14 is a view of two of the bins of FIG. 12 in nested position indicating a tendency of the nested stack to move out of vertical alignment;

FIG. 15 is a side elevational view of two nested bins according to FIG. 14 supported by a base bin which is in reverse position for holding a nested stack with the end edges of the stacked bins lying in a vertical plane;

FIG. 16 is a side elevational view of two of the bins of FIG. 12 stacked in a stepped back position for display purposes and with a third like bin acting as a base and oriented in the same direction and supporting the stack of stepped back bins with their end edges substatnially in a vertical plane;

FIG. 17 shows two of the nested bins of FIG. 14 utilizing a like bin as a base and oriented in the same direction for holding the nested stack vertically in line;

FIG. 18 is a perspective view of a bin comprising the fourth embodiment of this invention;

FIG. 19 is a side elevational view of two of the bins of FIG. 18 in nested position with a like bin serving as a base and oriented in the opposite direction for holding the stack of nested bins in vertical line;

FIG. 20 is an end elevational view showing two of the bins of FIG. 18 in nested position;

FIG. 21 is a side elevational view of the two nested bins of FIG. 20;

FIG. 22 is an end elevational view, partly broken away, showing two of the bins of FIG. 18 in tiered position; while FIG. 23 is a side elevational view of the two stacked bins of FIG. 22, parts being broken away to more clearly show the construction.

Figure 1:
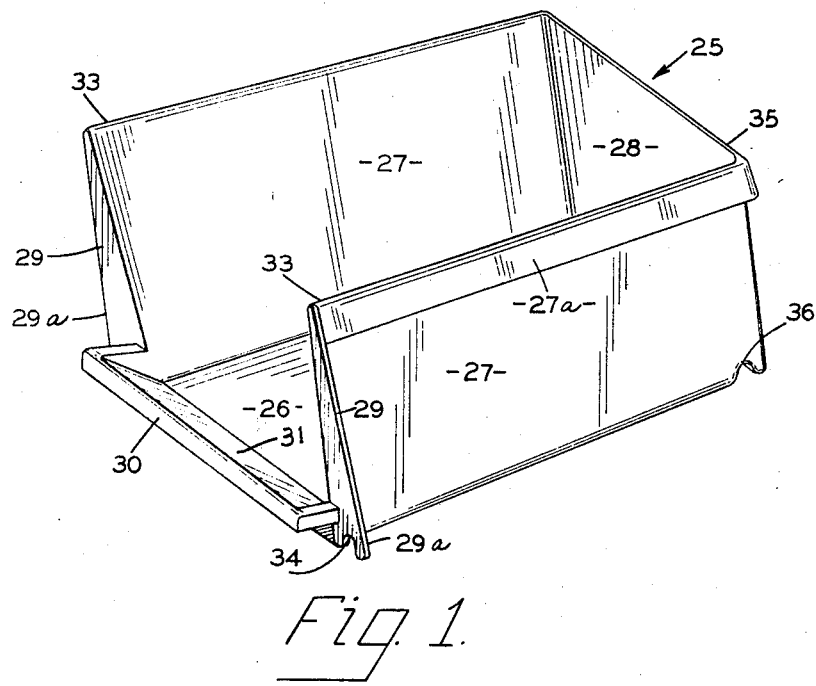
FIG. 1 is a perspective view of a bin according to the first embodiment of this invention.

Referring now to FIGS. 1 through 5, the bin 25, as is the case with all of the bins disclosed herein, is a single unitary structure and preferably made of sheet material. The invention is particularly intended for use with synthetic resins which can be molded to the various shapes shown herein and all designs disclosed herein are intended to be capable of molding so as to hold down the cost.

This bin 25 has a bottom 26 rigidly connected with opposite side walls 27 and an end wall 28 extending between the side walls and rigidly connected with the bottom also. Preferably, but not necessarily, a reinforcing lip 27a may extend along the three upper edges of the bin for appearance and for strength. The otherwise unsupported front ends of the side walls 27 are reinforced by laterally extending buttress members 29 whose inner edges are flush with the associated side walls and whose outer edges are inclined downwardly and outwardly so that the lower ends 29a extend laterally considerably beyond the side walls. These buttress members 29 greatly strengthen the side walls 27. A flat lip 30 is connected with a very short end wall 31 which extends from the bottom 26 up to the lip 30. This lip is rigid, of course, with all of the parts which it touches and especially with the buttress members 29 and this greatly strengthens the front end of the bin.

In FIGS. 2 and 3, two of the bins of FIG. 1 are tiered directly vertically in line to provide a true vertical stack. To this end, upper tiering support points 33 are provided vertically directly above lower tiering support points 34, which latter are in the form of grooves or notches extending longitudinally of the bin so as to prevent lateral movement between two tiered bins. Also, upper tiering support points 35 are vertically directly above lower tiering support points 36, these latter being transversely extending grooves which fit on the top edge of the rear wall 28 and prevent relative movement longitudinally of two tiered bins.

Referring to FIGS. 4 and 5, two of the bins of FIG. 1 are shown in nested relationship and the side walls 27 have their inward surfaces sloping downwardly and slightly toward each other so as to permit an upper bin to set down in a lower one. It will be noted in FIG. 5 that the upwardly inclined front lip 30 resists the tendency of the upper bin 25 to move forwardly out of the lower bin 25.

It will also be noted in FIG. 5 that the stack of nested bins tends to move vertically out of line toward the left by the thickness of a buttress member 29.

In the second embodiment shown in FIGS. 6 through 11, each bin 40 has a bottom 41, opposite parallel side walls 42 and a rear end wall 43 all in one unitary structure. The upper edges of walls 42 and 43 are turned over outwardly to form a rim 42a and 43a each of which has a trough 44 opening downwardly in position to embrace the upper edge of a similar bin as shown at the left-hand end of FIG. 7.

Figure 7:
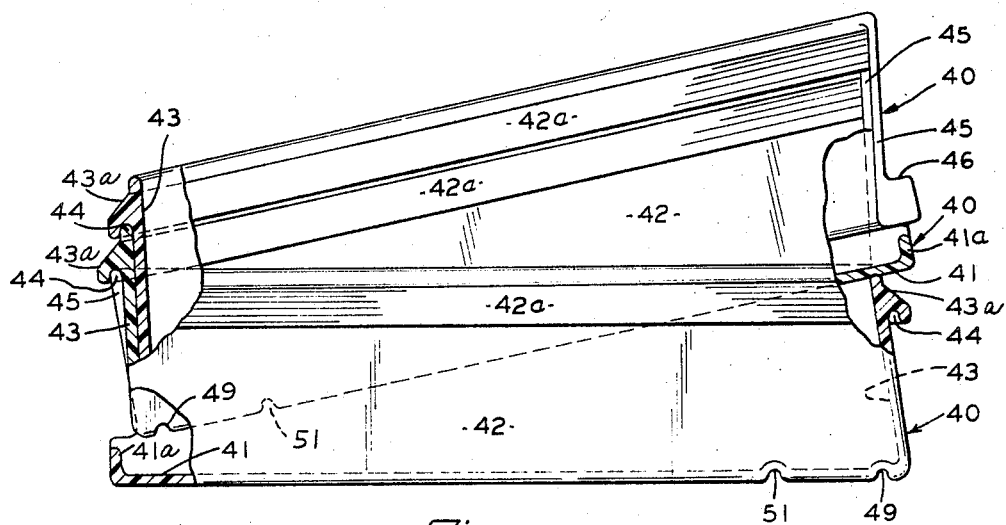
FIG. 7 is a view of three bins according to FIG. 6 of which the bottommost or base bin is reversed with respect to the stack of two nested bins above it so that the ends of the nested bins, which would otherwise be out of vertical line, have their ends terminating in substantially a vertical plane.

At the end opposite wall 43, the bottom 41 extends forwardly beyond the side walls 42 and has an upturned rim or lip 41a as clearly seen in FIG. 7. Buttress members 45 extend laterally outwardly at the front ends of the side walls 42, with their inner edges being flush with the side walls 42 and their outer edges inclined outwardly and downwardly in a generally V-shape formation, thus strengthening the forward ends of the side walls. The lip formed by the front portion of bottom 41 and by lip 41a is joined rigidly to the lower ends of the buttress members 45 by block construction 46 in which are incorporated lower tiering support points 47 vertically directly beneath upper tiering support points 48 which are at the forward ends of side walls 42 at their upper edges.

At the rear end of the bin, transversely extending notches 49 provide lower tiering support points directly vertically beneath upper tiering support points 50 which are on the upper edge of rear wall 43. It will be noted that the notches 49 are formed upwardly in the bottom 41 as clearly shown at 49a.

A second series of lower tiering support points 51 are provided which are utilized as shown in the upper portion of FIG. 9 to give a stepped back effect to two tiered bins for display purposes.

Figure 6:
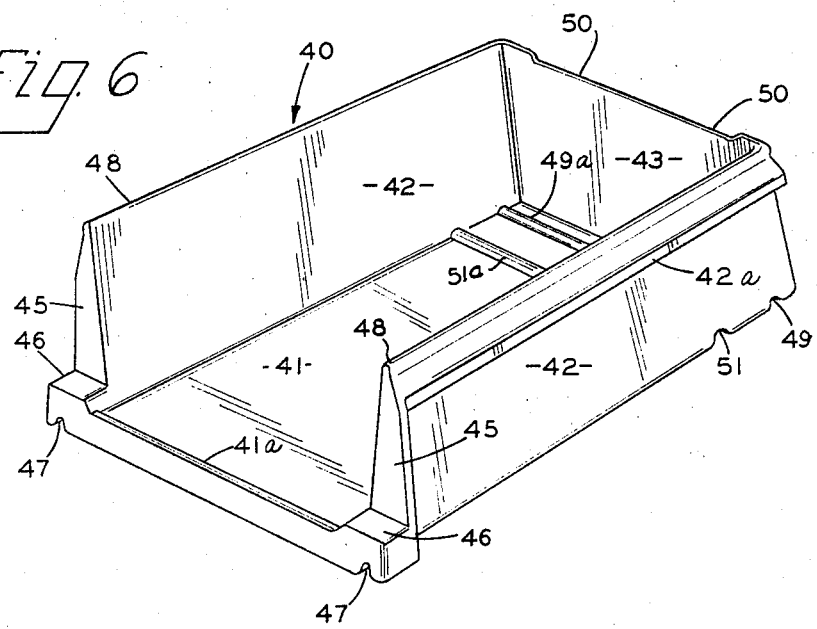
FIG. 6 is a perspective view of a bin of the second embodiment of this invention.

As shown in FIGS. 8 and 9, the lower two bins are like that shown in FIG. 6 and are stacked vertically in line with the lower support point 47 of the upper bin resting on the upper tiering support point 48 of a lower bin. At the rear of the bin, the lower tiering support 49 of the upper bin rests on the upper tiering support point 50 of the lower bin. This causes two like bins to tier exactly vertically in line.

In FIGS. 10 and 11, two of the bins 40 of FIG. 6 are shown in nested position and it will be noted that the inner surfaces of the side walls 42 incline inwardly and downwardly toward each other so that the upper bin can move down to a nested position in the lower bin. It will be seen in FIGS. 7 and 11 that in nested position the stack of nested bins tends to move out of vertical line by the amount of the overlapping buttresses 45. It will also be seen at the right-hand end of FIG. 11 that trough 44 of the upper bin embraces the upper edge of rear wall rim 43a so as to prevent the upper bin from moving forwardly out of nested position in the lower bin.

Referring specifically to FIG. 7, there is an arrangement shown whereby the stack of nested bins will be retained vertically in line. This utilizes one of the bins 40 reversed end for end with respect to the bins 40 in the stack so as to give an inclined base just sufficient to cause the end edges of the bins in the stack to lie in a vertical plane. As seen in FIG. 7, the support lies at the left-hand end upon the rim 43a of the first bin in the stack hooking over the upper end of buttress 45 of the base bin, while the right-hand end of FIG. 7 the bottom wall 41 of the first bin in the stack rests upon the rim 43a of the end wall 43 of the base bin.

A third embodiment of this invention is shown in FIGS. 12 through 17. The bin 55 has two opposed side walls 56 rigidly connected with a bottom 57 and with an end wall 58 in a unitary structure. Preferably, but not necessarily, a reinforcing bead 56a, 58a extends around the three sides of the bin. It will be noted that here again the front end of the bin is entirely open and the forward ends of the side walls are reinforced by buttress members 59 whose inside edges are flush with the side walls 56 and whose outside edges slope downwardly and outwardly from the top providing a very strong reinforcement for the forward ends of the side walls. A further reinforcement is provided by a front lip 57a which is a forward extension of the bottom wall 57 and which terminates at its forward end in a upturned lip 60. This lip is joined rigidly to the lower ends of the buttress members 59 by means of block members 61. This tie across the front end of the bin by means of the portions 57a, 60 and 61 gives a very strong reinforcement to this end of the bin. This is particularly increased by the L-shape structure provided by 57a, 60 which was also shown in the second embodiment in FIG. 7. At the forward end of the bin, there are provided upper tiering support points 62 which are vertically directly above support points 63 which are notches formed in the lower sides of the block members 61. At the rear of the bin, upper support points 64 are directly vertically above lower support points 65 which are downwardly opening notches in the bottom of the bin. These points cooperate as seen in FIG. 13 to support a bin tiered vertically in line with a like bin beneath it. Other notches 66 to the rear of notches 65 are useful as will be described in connection with FIGS. 15 and 16 and other notches 67 forwardly of notches 65 are useful as will be described in connection with FIG. 16.

It will now be seen, as clearly shown in FIG. 13, that two of the bins of FIG. 12 may be stacked vertically in line with upper tiering support points 62 and 64 coacting with lower tiering support points 63 and 65, respectively, to prevent movement of the stacked bins out of line either laterally or longitudinally.

In FIG. 14, two of the bins of FIG. 12 are shown nested, the side walls 56 being sloped downwardly and inwardly to prevent the nesting of an upper receptacle in the lower one. It will be noted that the stack tends to move upwardly toward the left in FIG. 14, each receptacle being a little ahead of the one below it by the thickness of the buttress member 59.

In FIG. 15, one of the receptacles of FIG. 12 is utilized in a position reversed 180 degrees to provide a base unit for a stack of nested bins so as to tilt the bottom member of the stack and thus cause the nested stack to remain vertical. At the left-hand end of FIG. 15, it will be noted that the upwardly projecting flange 60 on the lip 57a engages in the notches 66 of the lowest bin in the stack so as to prevent the stack from slipping toward the left. At the right-hand end, buttress members 59 support the nested stack in the position shown.

In FIG. 16, two of the bins 55 are shown stacked in a stepped back relationship for display purposes so that the tiering support points 64 of a lower bin are received in the tiering support notches 67 of the upper bin. In this position of the bins, the lip 60 prevents objects from sliding out of the bin whereas the customer can pick the article nearest him from the bin and the other articles will slide forward against the lip 60 so that it is a self-serving bin. One of the bins 55 is used as a base member at the bottom of the stack so as to provide vertical alignment. To this end, tiering support points 64 of the bottom base bin are received in tiering support notches 66 of the first bin in the stack and the block members 61 of the first bin in the stack rests against the members 61 of the base bin.

In FIG. 17, a stack of nested bins 55 is held in vertical alignment by being supported in a base bin 55 but turned in the opposite direction from that shown in FIG. 15. At the left-hand side of FIG. 17, notches 63 in lip 57a rest against upper support points 62 while at the right-hand side of the figure, the rim portion 58a of the base unit 55 engages against the rim member 58a of the bottom bin in the stack.

The fourth embodiment of this invention is shown in FIGS. 18 through 23. In FIG. 18, one of the bins 70 is shown having a bottom wall 71, two opposed side walls 72, and a rear end wall 73, all in a unitary structure. The upper rim of the side walls and of the end wall are bent downwardly and outwardly as shown at 72a and 73a to provide a downwardly opening trough as will be presently described. Spaced below and parallel to the upper edges of walls 72 and 73 is an outwardly extending shoulder 74 which limits the nesting action of two bins as will presently be described.

In contrast to the first three embodiments which were completely open at the front end of the bin, this fourth embodiment is partially enclosed at the front end of the bin by a partial front end wall 75 which comprises a tongue extending upwardly and inclined slightly forwardly from the bottom wall 71 and separated from the side walls by two V-shape notches 76. These tongues 75 are hollow and nest inside of each other as shown in longitudinal section in FIG. 19 and in transverse section in FIG. 20. Reinforcing buttress members 77 are provided at the forward ends of side walls 72 and these have a vertically extending upper portion 77a and a lower portion 77b which is inclined downwardly and outwardly to a point beyond the side walls 72. The inner edges of the buttress portions are flush with the inner surfaces of the side walls 72.

A reinforcing front lip 78 is provided approximately in line with the bottom wall 71 and extending across the entire front of the bin. This lip is rigidly connected with the buttress members 77 by means of upwardly bent end portions 78a providing notches 79 and gusset members 80 of generally triangular shape between the buttress member portions 77b and the lip portions 78a. This gives a very strong reinforcing construction at the front end of this bin. An upwardly recessed portion 81 is connected between the bottom wall 71 and the forward lip 78.

In FIGS. 20 and 21, two of the bins 70 are shown nested one within the other. To accomplish this, the inner faces of side walls 72 are sloped inwardly and downwardly toward the bottom wall 71 so as to receive like portions of another bin nested within it. The nesting relationship of the front end wall tongues 75 has previously been described. It will be noted in FIG. 20 that the nesting action is limited by the bent over rims 72a of the lower bin engaging the shoulder 74 of the upper bin.

Two of the bins 70 of FIG. 18 are shown in tiered relationship in FIGS. 22 and 23. At the forward end of the bin upper tiering support points 82 are provided vertically directly above the lower tiering support points provided by notches 79. At the rear end of the bin, upper tiering support points are provided at 83 vertically directly above lower tiering support points which are transversely extending notches 84 in the bottom wall 71. In FIG. 22 it will be noted that the points 79 and 82 cooperate to prevent movement laterally sideways of the two bins relative to each other, while in FIG. 23, the tiering support points 83 and 84 cooperate to prevent relative longitudinal movement between the two tiered bins.

In FIG. 19, it is shown how one of the bins 70 may be turned end for end at 180 degrees to a stack of nested bins so as to hold them in vertical alignment in view of the tendency of two nested bins to creep forwardly out of a vertical line as seen in FIG. 21. In FIG. 19, two bins 70 nested as described in connection with FIG. 21 are supported on a base bin 70 with the recess 81 of the lowest bin in the stack resting on the rim 73a of the base bin at the rear of the structure; and at the front end, the shoulder 74 of the lowest bin in the stack rests against the support points 82 of the base bin. This causes the nested stack to move upwardly in a vertical direction instead of sloping as in FIG. 21.

It will be noted in all four embodiments that the rear end walls 28, 43, 58 and 73 is inclined forwardly and upwardly so as to cause vertical registration of the support points 35, 36 in the first embodiment, 50, 49 in the second embodiment, 64, 65 in the third embodiment, and 83, 84 in the fourth embodiment.

It will also be noted that in the first embodiment the forward ends of the side walls 27 are inclined forwardly and upwardly sufficient to permit the buttress members 29 to nest parallel to each other as illustrated in FIG. 5. In the second, third and fourth embodiments, the forward ends of the side walls are inclined downwardly and rearwardly from the upper tiering support points so as to provide at the bottom longitudinally extended lower tiering support points which give a firmer lock between two stacked bins.

In the case of the first, second and third embodiments, it will be noted that two like bins may be nested one within the other by holding the upper bin with its bottom parallel to and slightly above the bottom of the lower bin and thereafter the upper bin may be moved horizontally to nested position in the lower bin.

What is claimed is:

1. A utility bin adapted to nest and stack with a like bin, comprising as a unitary structure a bottom wall, and end wall extending upwardly at one end of said bottom wall, two opposite side walls extending upwardly from two sides of said bottom wall and connected at their rear ends with said end wall, there being an opening for access to said bin at the end thereof opposite said end wall, and a buttress member at the front end of each side wall inclined from the top downwardly and laterally outwardly beyond the associated side wall, whereby said buttress members reinforce said side walls at the access end of said bin, said bin having upper tiering support points at the upper edge of said side walls and having lower tiering support points at the bottom edge of said side walls and directly vertically below said upper tiering support points whereby two like bins may be tiered vertically in line, and said bin being so constructed and arranged as to nest within a like bin.

2. A utility bin as defined in claim 1, including a front lip extending endwise beyond said side walls at the front end of said bin, said lip extending from side to side of said bin and having its ends rigidly connected with said buttress members.

3. A utility bin as defined in claim 2, including a gusset member at the bottom of each buttress member and at the laterally outer ends of said lip, each gusset member rigidly connected between the associated lip and buttress member to provide strong reinforcement across said access end of said bin.

4. A utility bin as defined in claim 2, wherein said lip extends from a zone near the bottom wall upwardly and forwardly, thereby resisting any tendency of an upper bin nested therein to move forwardly.

5. A utility bin as defined in claim 1, wherein said opening for access includes the entire end opposite said end wall, and said side walls are so constructed and arranged that a second bin may be nested in a first bin by passing said second bin into said first bin horizontally through said open end thereof and rearwardly to a substantially completely nested position save for said buttress members of said second bin.

6. A utility bin as defined in claim 1, wherein said opening for access includes a partial front end wall extending from said bottom wall upwardly to a zone short of the level of the upper edges of said side walls, and said partial end wall being so constructed and arranged as to nest with a like wall of a like bin.

7. A utility bin as defined in claim 6, there being upwardly opening V-shape notches in said partial end wall, one notch near each side wall, leaving an upstanding tongue between said notches, and said tongue being hollow to receive a like tongue of a like bin nested therewith.

8. A utility bin as defined in claim 7, including an outwardly extending shoulder on said side walls limiting the movement of an upper bin nesting downwardly in a lower bin.

9. A utility bin as defined in claim 1, wherein said bin is formed entirely of sheet material.

10. A utility bin as defined in claim 1, wherein all surfaces of said bin open toward the periphery thereof, whereby said bin may be molded as a unit from synthetic resin and then stripped from the mold.

11. A utility bin as defined in claim 1, wherein there is provided, as said lower tiering support points, downwardly opening transversely extending notches in said bottom wall near said end wall, and said end wall is inclined upwardly and forwardly from said bottom wall to place the upper edge of said end wall vertically directly above said notches to provide upper tiering support points there.

12. A utility bin as defined in claim 1, wherein there is provided, as said lower tiering support points, downwardly opening longitudinally extending notches vertically directly beneath the forward ends of the upper edges of said side walls which act as upper tiering support points there, and the forward ends of said side walls being inclined downwardly and rearwardly from said upper tiering support points and providing at the bottom thereof longitudinally extended lower tiering support points.

13. A utility bin as defined in claim 1, wherein at least some of said side and end walls are of sheet material turned over outwardly at the upper edge and forming a downwardly opening trough there, and said upper edges being so constructed and arranged as to cause the upper edge of a wall of a lower bin to enter into said trough of an upper bin in nested position.

14. A utility bin as defined in claim 1, wherein the front portions of a stack of nested bins lie in a plane inclined forwardly at a predetermined angle, and interengaging means on two like bins for supporting said stack on a like bin, acting as a base, at an angle to maintain said plane substantially vertical.

15. A utility bin as defined in claim 14 wherein said base is oriented in the same direction as the bins in said stack.

16. A utility bin as defined in claim 14, wherein said bin is oriented reversed 180 degrees from the direction of the bins in said stack.

17. A utility bin as defined in claim 1, wherein supplemental lower tiering support points are provided forwardly of said first named lower tiering support points, whereby the front end of each bin in a tiered stack thereof is set back at a predetermined distance from the front end of the bin below it so that the front portions of such a stack lie in a plane inclined rearwardly at a predetermined angle, and interengaging means on two like bins for supporting said stack on a like bin, acting as a base, at an angle to maintain said plane substantially vertical.

References Cited

UNITED STATES PATENTS

| | | | |
|---|---|---|---|
| 2,320,388 | 6/1943 | Shaw | 211—126 |
| 3,207,321 | 9/1965 | Joyce | 211—126 |
| 3,252,614 | 5/1966 | Evans | 211—126 X |
| 3,347,394 | 10/1967 | Gould | 211—126 |
| 3,392,877 | 7/1968 | Sanders | 211—126 X |
| 3,407,960 | 10/1968 | Rogus | 211—126 X |

NILE C. BYERS, JR., Primary Examiner

U.S. Cl. X.R.

108—91